B. J. GRIGSBY.
ELECTRIC SEARCHLIGHT FOR MOTOR VEHICLES.
APPLICATION FILED DEC. 19, 1921.
1,433,504. Patented Oct. 24, 1922.
2 SHEETS—SHEET 1.
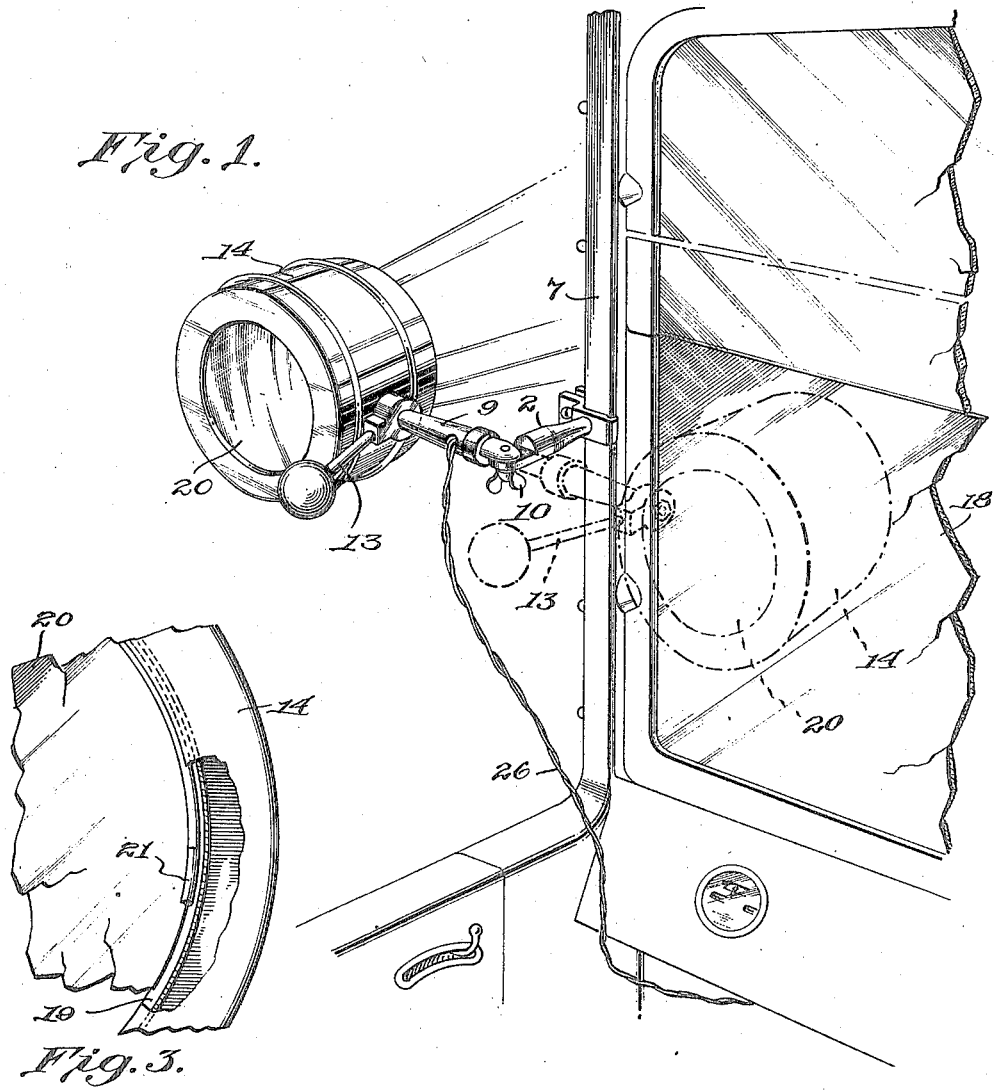
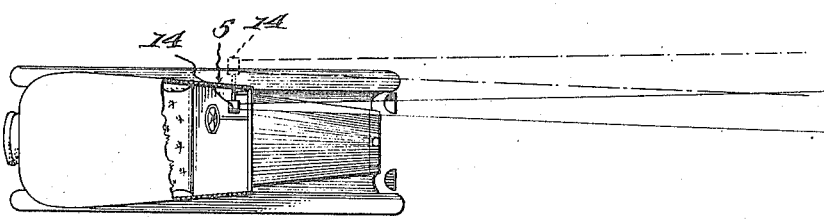
Inventor
B. J. Grigsby
Eugene C. Brown
Attorney

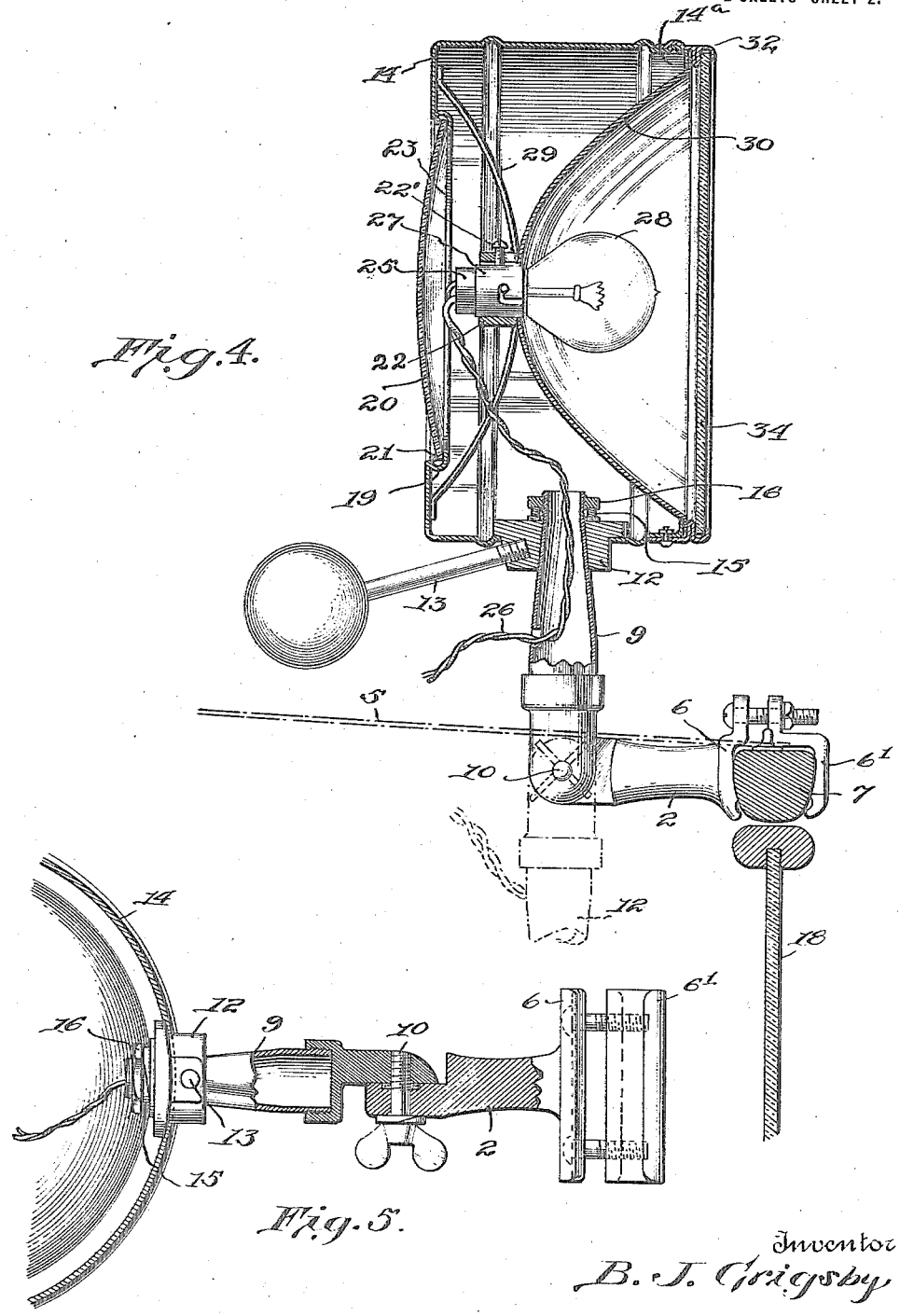

Patented Oct. 24, 1922.

1,433,504

UNITED STATES PATENT OFFICE.

BERTRAM J. GRIGSBY, OF PARK RIDGE, ILLINOIS, ASSIGNOR TO GRIGSBY-GRUNOW-HINDS CO., OF CHICAGO, ILLINOIS, A CORPORATION OF ILLINOIS.

ELECTRIC SEARCHLIGHT FOR MOTOR VEHICLES.

Application filed December 19, 1921. Serial No. 523,500.

*To all whom it may concern:*

Be it known that I, BERTRAM J. GRIGSBY, a citizen of the United States, residing at Park Ridge, in the county of Cook and State of Illinois, have invented certain new and useful Improvements in Electric Searchlights for Motor Vehicles, of which the following is a specification.

This invention relates to dirigible headlights, usually known as searchlights or "spot lights" and is particularly adapted for use upon the wind shields of automobiles.

The searchlights are usually attached to the windshield frame within easy reach of the driver so that it may be readily adjusted to any desired position. The existing types of searchlights are particularly adapted to open or touring cars. When the weather curtains are in place, however, it is very difficult, if not impossible, to manipulate them. Special constructions of gear or lever mechanisms have been proposed to enable the lights to be controlled from the inside of the car but they are costly and more or less complicated.

The main purpose of my invention is to provide a searchlight which can be quickly swung from the outside of the car to the inside and may be easily manipulated by the driver in either position. When the curtains are to be put on, the searchlight is swung to the inside of the car and is then in a position to project the light through the windshield. Further objects of my invention are to provide an adjustable supporting bracket which will permit of the movements above specified and improve the construction of the searchlight casing.

In the following detailed description I shall refer to the accompanying drawings, in which—Figure 1 is a perspective view showing my searchlight and the manner of attaching it to the windshield frame; Fig. 2 is a diagrammatic plan view of an automobile equipped with my searchlight and indicating the inside and outside positions and the manner in which the beam of light is projected; Fig. 3 is an enlarged fragmentary view of the rear end of the searchlight casing showing the manner of mounting a mirror therein; Fig. 4 is a horizontal central sectional view of the searchlight and of the adjustable supporting bracket; and Fig. 5 is a fragmentary sectional view of the same at right angles to the view in Fig. 4.

In order that the stationary support or post 2 which carries the clamp for attachment to the windshield frame, shall not interfere with the weather curtains 5, I construct the clamp members 6, 6' so that they position the post 2 rearward of the windshield frame 7, inside of the curtain line, the post being thus substantially at right angles to the usual position of searchlight supports. The adjustable bracket arm 9 is pivotally secured by the screw 10 to the post 2 by an elbow joint movable in a horizontal plane. The outer end of the bracket arm 9 is tapered and passes through a correspondingly tapered aperture in a flanged socket-member 12 secured in the side wall of the searchlight casing 14. The casing may be turned in a vertical plane about the arm 9 by means of the handle and is frictionally held in any desired position by means of a spring washer 15 interposed between the socket-member and the lock-nut 16.

When the weather curtains are not in use the bracket arm 9 is swung outwardly into the position shown in full lines in Figs. 1 and 4, which is the normal position for an open car.

In case it is desired to put on the weather curtains, the bracket arm 9 is swung through 180° to bring the arm within the enclosure of the car into the position indicated in dotted lines in Fig. 4. The searchlight will be facing rearwardly and accordingly the casing 14 is then rotated in a vertical plane into the reverse position to thereby face the lamp forwardly with the lens substantially parallel to the plane of the wind-shield 18, as indicated in Fig. 1. In this position the searchlight and its support are entirely within the curtain line and the curtains may therefore be put on without interference. The light beam may be directed by manipulating the handle 13 to tilt the casing exactly as when it is in the usual outer position. Whenever it is desired to use the lamp as an inspection light, the arm 9 may be detached from the post 2 by removing the thumbscrew 10 so that the lamp may be carried about within the limits of the cord 26.

The construction of the searchlight will be understood from the sectional view shown in Fig. 4. The casing 14 is stamped or spun from an integral metal sheet and is formed in its rear face with a recess, the margin of which is rolled outwardly to form a groove 19 to receive the periphery of a mirror 20 and the spring locking ring 21. A central aperture 23 in the recessed portion, permits the insertion of the metal shell 27 of the socket which carries the insulated base 25 through which the terminals of the electric conductor cord 26 project. The lamp socket 27 is carried by the sleeve 22 attached to the parabolic reflector 30, the lamp being held at the focal point of the reflector by the screw. 22'. The peripheral flange of the parabolic reflector is held between an inwardly directed flange 14ª on the casing and the cover, being pressed tightly against the cover by a bowed strip of spring metal 29. The lens 34 is secured by a bead on the cover which is spun thereover.

The advantages of my interchangeable outside and inside position searchlight will be especially appreciated by automobile operators who have had experience with existing searchlights. The prime idea of the invention is to provide a searchlight which may be dirigibly mounted upon a windshield frame so that it can be readily moved and operated either within or without the vehicle. It will be understood, therefore that many other types or designs of searchlights and of clamping means also may be substituted for the particular constructions shown for the purposes of illustration without departing from the invention.

I claim:—

1. An electric searchlight for motor vehicles, comprising a standard or post provided with clamping means for attachment to the vertical frame member of a wind-shield to position the post horizontally within the car and rearwardly of said frame member, a bracket arm pivoted to the outer end of said post to swing in a horizontal plane, and a lamp casing pivotally secured to the outer end of said bracket arm and rotatable in a vertical plane.

2. An electric searchlight for motor vehicles, comprising a standard or post provided with clamping means for attachment to the vertical frame member of a wind-shield to position the post horizontally within the curtain line of the car and rearwardly of said frame member, a bracket arm pivoted to the outer end of said post to swing in a horizontal plane, a lamp casing having a socket member adapted to receive the outer end of said bracket arm, and means for securing said socket member while permitting its rotary movement about the arm.

3. An electric searchlight for motor vehicles as set forth in claim 2, and said casing being provided in its rear face with an inturned annular groove to form a seat for a mirror.

In testimony whereof I affix my signature.

BERTRAM J. GRIGSBY.